United States Patent [19]

Hesse et al.

[11] 3,852,373
[45] Dec. 3, 1974

[54] PROCESS FOR THE PRODUCTION OF LIQUID BUTADIENE POLYMERS

[75] Inventors: Karl-Dieter Hesse; Hans Von Portatius, both of Marl, Germany

[73] Assignee: Chemische Werke Huls Aktiengesellschaft, Marl, Germany

[22] Filed: May 9, 1972

[21] Appl. No.: 251,648

[30] Foreign Application Priority Data
May 10, 1971  Germany............................ 2122956

[52] U.S. Cl. .......................... 260/680 B, 260/669 P
[51] Int. Cl. ............................................... C08f 1/52
[58] Field of Search ..................... 260/680 B, 677 R

[56] References Cited
UNITED STATES PATENTS

| | | | |
|---|---|---|---|
| 3,066,127 | 11/1962 | Carlson et al...................... | 260/94.3 |
| 3,312,752 | 4/1967 | Schleimer........................ | 260/680 B |
| 3,329,734 | 7/1967 | Schleimer et al. .............. | 260/680 B |
| 3,341,617 | 9/1967 | Schleimer et al. .............. | 260/680 B |
| 3,530,197 | 9/1970 | McClure ........................ | 260/680 B |
| 3,567,792 | 3/1971 | Bozik et al. ..................... | 260/677 R |
| 3,725,492 | 4/1973 | Ukita et al. ..................... | 260/680 B |

Primary Examiner—Paul M. Coughlan, Jr.
Attorney, Agent, or Firm—Millen, Raptes & White

[57] ABSTRACT

A process for preparing liquid butadiene polymers which comprises polymerizing 1,3-butadiene at a temperature of 10°–180°C with a catalytic amount of a mixed catalyst including a solvent-soluble organonickel compound and an organoaluminum compound in contact with a molecular weight regulating amount of at least one monoolefinically unsaturated compound of the formula

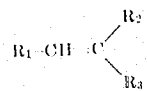

wherein $R_1$ and $R_2$ are each hydrogen, chlorine, or alkyl of 1–5 carbon atoms, and $R_3$ is hydrogen or chlorine. High yields are attainable at elevated polymerization temperatures without extreme increases in viscosity of the product.

5 Claims, No Drawings

PROCESS FOR THE PRODUCTION OF LIQUID BUTADIENE POLYMERS

BACKGROUND OF THE INVENTION

1. Field of the Invention

This invention relates to a process for producing liquid butadiene polymers. More particularly, this invention relates to such a process using molecular weight regulators which are effective at elevated polymerization temperatures.

2. Description of the Prior Art

Liquid butadiene polymers, including both homopolymers and copolymers with monoolefins or conjugated diolefins, are well known in the art. Liquid butadiene polymers having predominantly centrally positioned double bonds and viscosities of 50–50,000 centipoises are suitable for many uses, including, inter alia, as plasticizers for rubbers, in the production of air-drying coatings, and as starting materials for products such as maleic acid anhydride or fumaric acid adducts which are water-soluble in the saponified form, and epoxides.

Liquid polybutadienes or liquid butadiene copolymers can be produced in a known manner by polymerization or copolymerization of butadiene with one or more additional di- or monoolefins in the presence of mixed catalysts comprising at least one diluent-soluble organonickel compound and at least one organoaluminum compound in the presence of an inert diluent and a molecular weight regulator, such as taught in U.S. Pat. No. 3,341,617 which is incorporated by reference herein. In these manufacturing processes, the polymerization is generally conducted at temperatures of not more than 30°C. The space-time yield obtained by these methods is essentially limited by the amount of heat which can be efficiently removed. Therefore, it would be desirable in commercial scale polymerization to allow the strongly exothermic polymerization reaction to proceed at temperatures in excess of 30°C, since this mode of operation would make it possible to increase the temperature difference between the contents of the reactor and the cooling medium, and thus the evolving heat of reaction could be more quickly removed. In this manner, higher space-time yields can be obtained, which greatly improves the economic advantages of such a process. In practice, however, an increasing polymerization temperature under the aforementioned conditions results in an increase in the viscosity of the polymer products. This viscosity increase cannot be compensated for by the regulators known heretofore for the production of liquid butadiene polymers, such as, for example, amines or vinylcycloolefins, without simultaneously causing a drastic decrease in yield. Furthermore, the presence of large amounts of these prior art molecular weight regulators inhibits the catalyst system. When using these prior art regulators, it is additionally impossible to conduct the polymerization in the absence of solvent or even with a high butadiene concentration in the solvent without rapidly increasing the viscosity of the product or gelling the charge.

Accordingly, it is an object of the present invention to provide an improved process for preparing liquid butadiene polymers.

Another object of this invention is to provide a process for preparing gel-free butadiene polymers at elevated polymerization temperatures.

An additional object of this invention is to provide a process for preparing liquid butadiene polymers of controlled viscosity at elevated polymerization temperatures.

A further object of this invention is to provide molecular weight regulators for butadiene polymerization which do not inhibit organonickel-organoaluminum catalysts even when present in high concentrations.

Other objects, features, and advantages of this invention will be apparent to those skilled in the art to which this invention pertains from the following description thereof.

SUMMARY OF THE INVENTION

The present invention provides a process for preparing liquid butadiene polymers which comprises polymerizing 1,3-butadiene at a temperature of 10°–180°C with a catalytic amount of a mixed catalyst including a solventsoluble organonickel compound and an organoaluminum compound in contact with a molecular weight regulating amount of at least one monoolefinically unsaturated compound of the formula

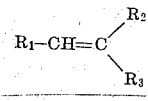

wherein $R_1$ and $R_2$ are each hydrogen, chlorine, or alkyl of 1–5 carbon atoms, and $R_3$ is hydrogen or chlorine.

DETAILED DISCUSSION

Within the scope of the present invention, the term "butadiene polymers" includes homopolymers and copolymers of butadiene. Suitable comonomers for the production of liquid butadiene copolymers include but are not limited to conjugated diolefins having more than 4 carbon atoms, styrene, and α- or ring substituted styrenes. Preferred comonomers are isoprene, 2,3-dimethylbutadiene, styrene, α-methylstyrene, or mixtures thereof.

The mixed catalysts useful in the process of the present invention contain at least one organonickel compound which is soluble in the polymerization diluent employed. Suitable diluent-soluble nickel compounds include but are not limited to nickel salts of organic carboxylic acids, preferably containing 2–20 carbon atoms, such as nickel octoate and nickel oleate; nickel complexes, such as nickel acetylacetonate, nickel tetracarbonyl, Ni[O]biscyclooctadiene, diallylnickel, dicyclopentadienylnickel, and the like. The nickel-containing catalyst component is employed in catalytic amounts of 0.0005 – 0.5 part by weight, preferably 0.001 to 0.1 part by weight, based on the monomer feed.

The mixed catalysts also contain at least one organoaluminum compound of the formula

wherein
R is hydrogen, alkyl of 1–3 carbon atoms, phenyl or alkylphenyl having 1–3 carbon atoms in the alkyl substituent;

X is chlorine or bromine; and n is a whole or fractional number from 1 to 2 inclusive.

Preferred organoaluminum compounds are alkyl aluminum dihalides and mixtures of dialkyl aluminum halides with aluminum trihalides or alkyl aluminum dihalides wherein the alkyl group has 1 to 3 carbon atoms. Especially preferred are alkylaluminum sesquihalogenides, and particularly ethyl aluminum sesquichloride, $Al(C_2H_5)_{1.5}Cl_{1.5}$.

The organoaluminum catalyst component is used in catalytic amounts of 0.01 to 2, preferably 0.05 to 1 parts by weight as aluminum, based on the monomer feed. The molar ratio of the nickel compound to the aluminum compound in the mixed catalysts is generally 1:4 to 1:100, preferably 1:4 to 1:50.

Olefinically unsaturated compounds can be used as molecular weight regulators because they do not polymerize, or polymerize only very slightly using the aforementioned mixed catalysts. Suitable monoolefinically unsaturated compounds having such properties include but are not limited to ethylene; propylene; n-butene-1; n-butene-2; n-pentenes, hexenes, and octenes; vinyl chloride; and vinylidene chloride.

The olefinically unsaturated compounds, in contrast to the regulators of the prior art used in the production of liquid butadiene polymers, exhibit a stronger regulatory effect at higher temperatures than at lower temperatures. Although the viscosity of the final product also increases to some degree with increasing temperature in the process using the molecular weight regulators of this invention, this does not take place to the extent as occurs with prior art molecular weight regulators, such as amines, as shown in Table 1.

A further feature of the process of this invention is that the monoolefinically unsaturated regulating compounds can be used in higher concentrations than prior art molecular weight regulators without resulting in inhibition of the catalyst system.

The degree of molecular weight regulation of the molecular weight regulators of this invention varies from one compound to the next, but increases in each case with increasing concentration of the molecular weight regulator in the polymerization charge. Because of this unique property, the monoolefinically unsaturated molecular weight regulators of this invention can be used as diluents during the polymerization process, either by themselves or in a mixture. Particularly suitable in this connection are propylene, butene-1, and butene-2. Consequently, it is possible to use butadiene-containing C$_4$-cuts directly in the polymerization process, wherein the butadiene is present as the monomer and butenes and butanes are present as diluents. The butadiene content of the C$_4$-cuts is generally 20–90 percent, preferably 30–80 percent.

The use of volatile molecular weight regulators such as propylene or butenes also affords the advantage that the heat liberated during the polymerization can be removed by evaporative cooling, which is particularly advantageous in a continuous process where the exothermic polymerization reaction otherwise causes a heat buildup.

Using the somewhat more strongly regulating ethylene, it is also possible to polymerize the butadiene practically by block polymerization without any additional solvent, wherein the heat of polymerization can likewise by removed by evaporative cooling.

The molecular weight regulators of this invention can be used either alone or in combination with conventional regulators, if special advantages are obtained by this combination. Suitable conventional molecular weight regulators include but are not limited to amines or ethers.

In addition to the above diluents, conventional inert diluents can be used, such as aliphatic, cycloaliphatic, and aromatic hydrocarbons having 4–12 carbon atoms inclusive, chlorinated hydrocarbons, or mixtures of these diluents. Preferred inert diluents are butane, hexane, cyclohexane, benzene, toluene, and xylene.

The polymerization reaction is conducted continuously or discontinuously at a temperature between 10 and 180°C, preferably between 30° and 125°C, and especially between 40° and 125°C, with the substantial exclusion of oxygen and moisture, generally under inherent pressure, and optionally under an inert gas atmosphere. By the substantial exclusion of oxygen and moisture is meant that the quantities of these materials are negligible as compared to the amount of catalyst present, preferably less than 2 percent based on the amount of catalyst, since these materials undesirably increase the molecular weight and viscosity of the polymer products.

The thus-obtained solutions of polymerized product are worked up in a conventional manner, e.g., by decomposing the mixed catalyst with water, optionally with added organic, inorganic or acid bases, heating to above 50°C, and simultaneously washing the organic phase therewith. After separation of the wash water, the diluent is distilled of from the polymer by any suitable technique.

The thus-obtained liquid butadiene polymers have average molecular weights of 500–10,000, preferably 750–5,000, and viscosities of 50–50,000 cps, preferably 150–10,000 cps, measured at 20°C in the Hoepler falling-ball viscometer according to Haake, the particular molecular weight and viscosity depending on the particular reaction conditions used during polymerization. Liquid butadiene polymers produced in accordance with this invention possess 30–90 percent, preferably 60–85 percent cis-double bonds; 10–70 percent, preferably 15–40 percent trans-double bonds; and less than 5 percent, preferably less than 3 percent vinyl-double bonds; at least 90 percent of the double bonds are centrally positioned.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE I (Experiments 1–10) and Comparative Example (Experiments A–H)

100 parts by weight of dry benzene and 10 parts by weight of butadiene were fed into a pressure reactor under a nitrogen atmosphere. Thereafter, the following components were added under agitation: 0.06 part by weight nickel, as nickel octoate; 0.9 part by weight ethyl aluminum sesquichloride in the form of a 20 percent solution in benzene; and the various amounts of regulator set forth in Table 1. At the reaction temperatures shown in Table 1, an additional 90 parts by weight of butadiene was added over the next 2–4 hours. The mixture was agitated for another half hour, and the reaction solution then washed with 300 parts by weight of water acidified to pH 2 with HCl. After separating the aqueous solution, benzene was distilled off from the oily liquid polymer, and the polymer recovered for testing.

The conversions and viscosities of the thusly-obtained butadiene polymers are shown in Table 1.

EXAMPLE II

Five parts by weight of butadiene were added to a pressure reactor under a nitrogen atmosphere, together with the amounts of solvent and/or molecular weight regulator indicated in Table 2. Subsequently, ethyl aluminum sesquichloride and nickel as nickel octoate were added as set out in Table 2. 95 parts by weight of additional butadiene were then added over the next 2.5 hours at the temperatures shown in Table 2. The liquid polymer products were worked up as described in Example 1.

EXAMPLE III 300 parts by weight of a $C_4$-hydrocarbon mixture, the composition of which is shown in Table 3b, was charged into a pressure reactor, optionally together with an additional regulator, as shown in Table 3a. 0.04 percent by weight nickel in the form of nickel octoate was added to this charge followed by the addition of 0.9 percent by weight ethyl aluminum sesquichloride (based on butadiene contained in the $C_4$-hydrocarbon mixture). The reaction charge was maintained for 3 hours at the temperatures set forth in Table 3a, and then terminated by adding 600 parts by weight of acidic water. The thusobtained product was washed and worked up in the same manner described for Example 1. The conversions and viscosities of the butadiene polymers produced by these experiments are shown in Table 3a.

TABLE 1

| Experiment | Temp. °C. | Regulator | Amount of Regulator, Based on Butadiene % by Weight | Conversion % | Viscosity cp./20°C. |
|---|---|---|---|---|---|
| 1 | 10 | Ethylene | 1.0 | 96 | 1,100 |
| 2 | 25 | do. | 1.0 | 97 | 752 |
| 3 | 25 | do. | 5.0 | 96 | 300 |
| 4 | 25 | do. | 7.5 | 98 | 210 |
| 5 | 30 | do. | 10.0 | 90 | 160 |
| 6 | 40 | do. | 1.0 | 95 | 665 |
| 7 | 40 | do. | 15.0 | 85 | 99 |
| 8 | 50 | do. | 1.0 | 98 | 1,031 |
| 9 | 100 | do. | 1.0 | 99 | 29,700 |
| 10 | 100 | do. | 7.5 | 96 | 905 |
| A | 25 | none | — | 100 | 2,315 |
| B | 10 | $NH_3$ | 0.03 | 100 | 715 |
| C | 25 | do. | 0.03 | 95 | 730 |
| D | 25 | do. | 0.3 | nil | — |
| E | 40 | do. | 0.03 | 95 | 1,070 |
| F | 50 | do. | 0.03 | 96 | 4,390 |
| G | 100 | do. | 0.03 | 98 | Gelled |
| H | 100 | do. | 0.3 | <10 | Not Determined |

TABLE 2

| Experiment | Solvent Type | Solvent Parts by Weight | Regulator Type | Regulator Parts by Weight | Ni Parts by wt. | $Al(C_2H_5)_{1.5}Cl_{1.5}$ Parts by Weight | Temp. °C. | Conversion % | Viscosity cp./20°C. |
|---|---|---|---|---|---|---|---|---|---|
| 1 | Benzene | 20 | Ethylene | 8 | 0.01 | 0.2 | 45 | 92 | 233 |
| 2 | do. | 10 | do. | 8 | 0.01 | 0.2 | 45 | 92 | 286 |
| 3 | do. | 5 | do. | 8 | 0.01 | 0.2 | 45 | 95 | 519 |
| 4 | do. | 0 | do. | 8 | 0.01 | 0.2 | 45 | 92 | 579 |
| 5 | do. | 70 | Propylene | 30 | 0.025 | 0.5 | 45 | 100 | 525 |
| 6 | do. | 70 | do. | 30 | 0.025 | 0.5 | 60 | 93 | 567 |
| 7 | do. | 70 | do. | 30 | 0.025 | 0.5 | 100 | 90 | 1,290 |
| 8 | do. | 70 | do. | 30 | 0.025 | 0.5 | 125 | 75 | 990 |
| 9 | do. | 70 | do. | 30 | 0.025 | 0.5 | 150 | 60 | 3,440 |
| 10 | Hexane | 100 | Ethylene | 10 | 0.025 | 0.5 | 45 | 92 | 246 |

TABLE 3a

| Experiment | Temp. °C. | Solvent | Additional Regulator Type | Additional Regulator Parts by Weight, Based on Butadiene | Conversion % | Viscosity cp./20°C. |
|---|---|---|---|---|---|---|
| 1 | 25 | Butane | — | — | 68 | Immeasurable |
| 2 | 25 | n-Butene-1 | — | — | 99 | 1,500 |
| 3 | 25 | n-Butene-2 | — | — | 100 | 1,500 |
| 4 | 25 | $C_4$-Hydrocarbon Mixture | — | — | 95 | 2,358 |
| 5 | 25 | do. | Ethylene | 1.0 | 94 | 1,125 |
| 6 | 40 | do. | do. | 5.0 | 89 | 860 |
| 7 | 25 | do. | $NH_3$ | 0.04 | 64 | 880 |
| 8 | 25 | do. | Vinyl Chloride | 2.5 | 85 | 870 |
| 9 | 25 | do. | Vinylidene Chloride | 5.0 | 89 | 889 |

TABLE 3b

Composition of the $C_4$-Hydrocarbon Mixtures (or Butadiene Plus Solvent, Corresponding to Table 3a) in % by Weight

|  | Experiment 1 | Experiment 2 | Experiment 3 | Experiments 4–9 |
|---|---|---|---|---|
| 1,3-Butadiene | 40.2 | 41.12 | 41.2 | 41.13 |
| 1,2-Butadiene | 0.01 | 0.01 | 0.02 | 0.01 |
| n-Butene-1 | 0.08 | 58.53 | 0.13 | 15.37 |
| cis-n-Butene-2 | 0.09 | 0.07 | 22.84 | 4.65 |
| trans-n-Butene-2 | 0.09 | 0.01 | 32.0 | 5.44 |
| Isobutene | 0.1 | 0.01 | 0.05 | 28.04 |
| n-Butane | 59.24 | 0.26 | 0.06 | 4.53 |
| Isobutane | 0.11 | 0.01 | 3.45 | 0.82 |
| 1-Butyne | 0.01 | 0.01 | 0.01 | 0.01 |
| 2-Butyne | 0.01 | 0.01 | 0.01 | 0.01 |
| Vinylacetylene | 0.02 | 0.01 | 0.01 | 0.01 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for the production of gel-free liquid polybutadiene polymers having an average molecular weight of 500 – 10,000 and a viscosity of 50–50,000 cps measured at 20°C in the Hoepler fallingball viscometer according to Haake, and 30–90 percent cisdouble bonds, 10–70 percent trans-double bonds and less than 5 percent vinyl double bonds, at least 90 percent of the double bonds being centrally positioned, which process comprises polymerizing 1,3-butadiene in an inert diluent and in the presence of a negligible quantity of less than 2 percent by weight of oxygen and water based on the amount of catalyst with a catalytic amount of a mixed catalyst comprising a. at least one diluent-soluble organonickel compound selected from the group consisting of nickel octoate, nickel oleate, nickel acetylacetonate, nickel tetracarbonyl, Ni[0 bis-cyclooctadiene, diallylnickel and dicyclopentadienyl-nickel, and b. an alkylaluminum sesquihalide having 1–2 carbon atoms in the alkyl group, in a molar ratio of the nickel compound a) to the aluminum compound b) of 1:4 to 1:50, the improvement which comprises:

conducting the polymerization in the presence of a molecular weight regulating amount of 1–15 percent by weight ethylene or about 30 percent by weight propylene at a temperature of 10°–180°C to produce said liquid polybutadiene polymer.

2. Process according to claim 1, wherein the molecular weight regulator is ethylene.

3. Process according to claim 1, wherein the polymerization is conducted at temperatures of 30°–125°C.

4. Process according to claim 1, wherein said inert diluent includes at least one of butane, hexane, cyclohexane, benzene, toluene, or xylene.

5. Process according to claim 1, wherein said organoaluminum compound is ethyl aluminum sesquichloride.

* * * * *